July 14, 1964   D. R. HOLCOMB ETAL   3,141,164
RADAR RECEIVER UTILIZING NARROW BAND FILTERING AND MULTIPLEXING
Filed June 23, 1958   4 Sheets-Sheet 1

INVENTORS.
DON R. HOLCOMB,
RICHARD M. JAFFE,
JOHN M. PEW,
ERCELL E. ST JOHN,
BY Walter J. Adam
ATTORNEY

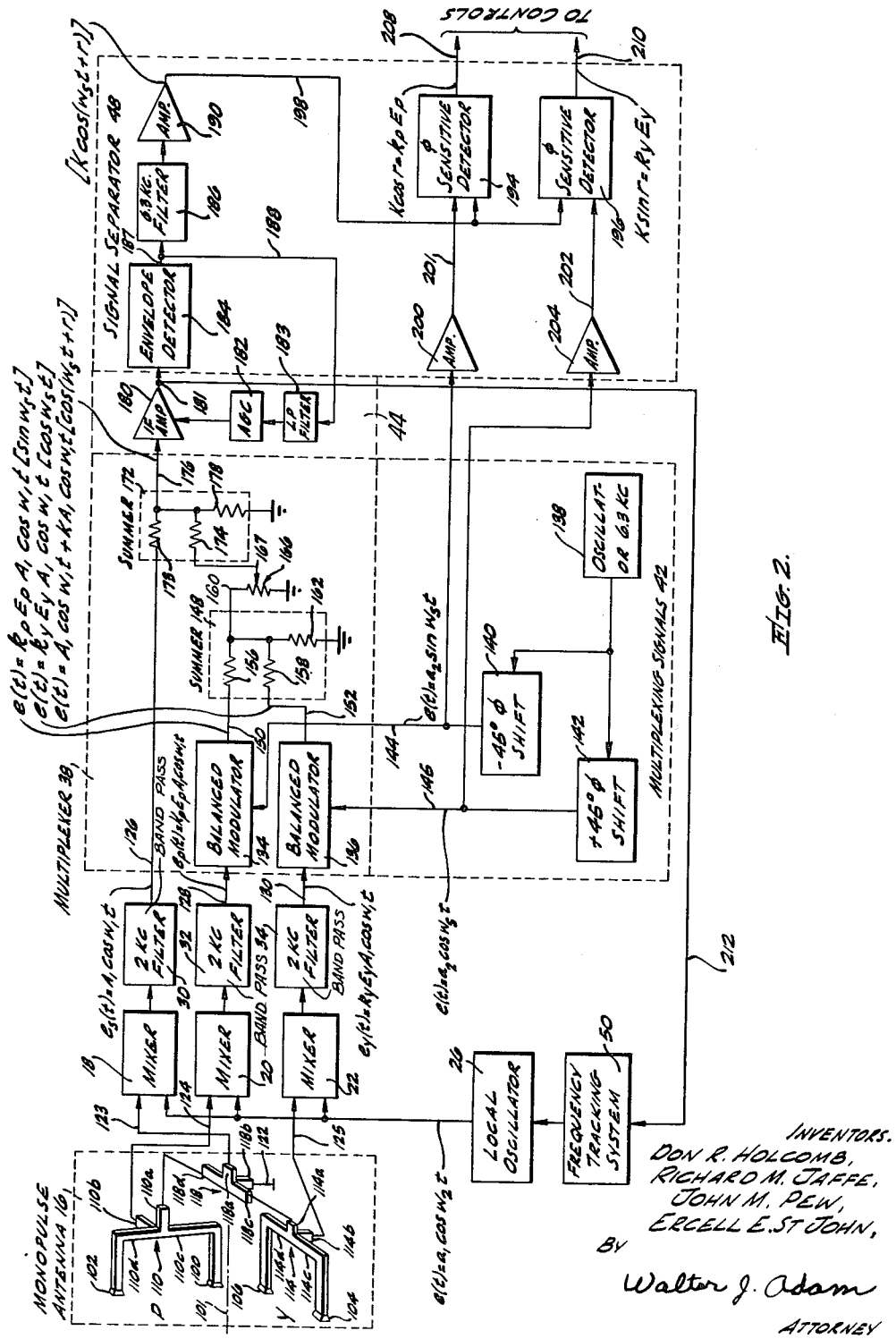

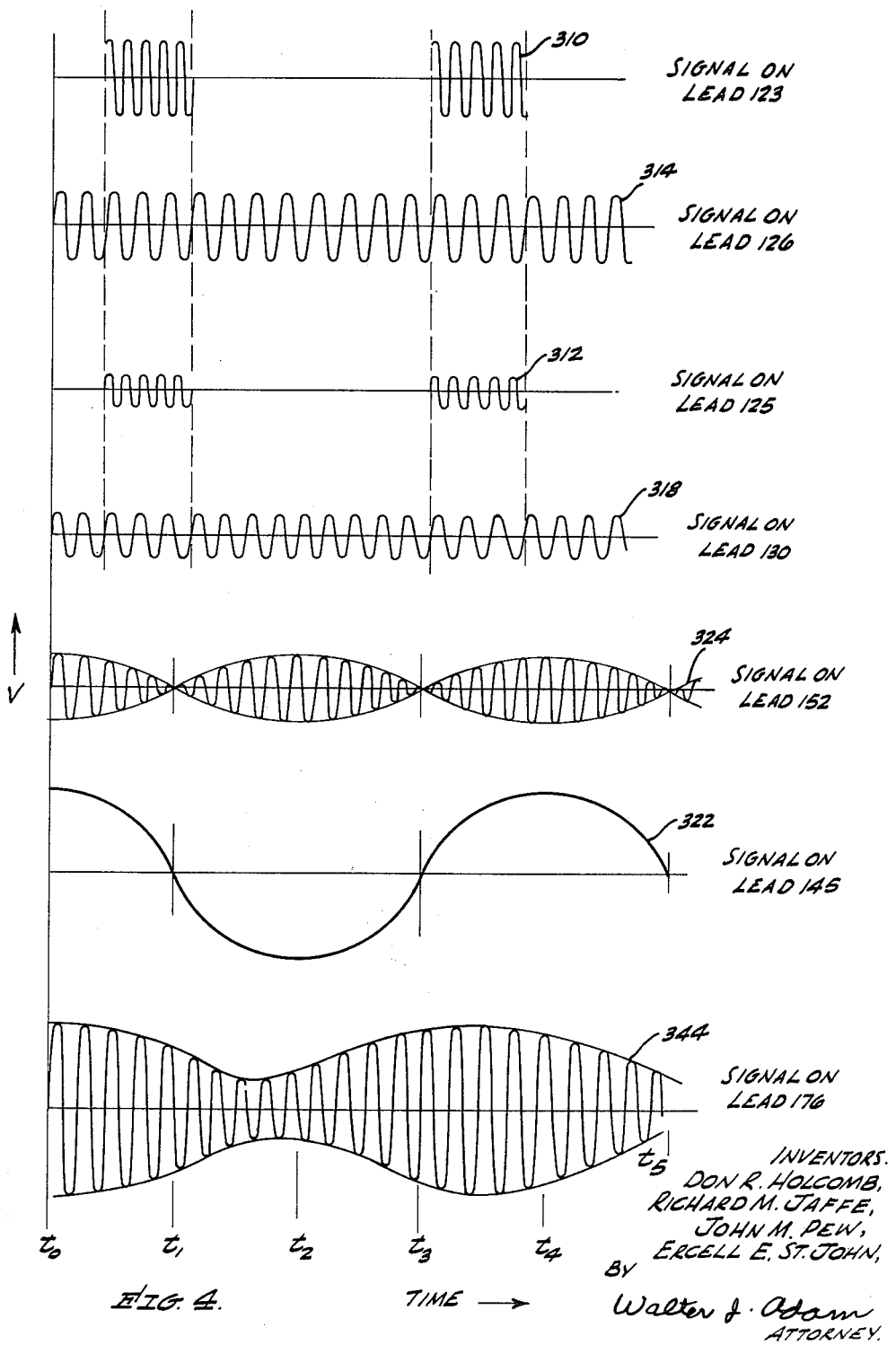

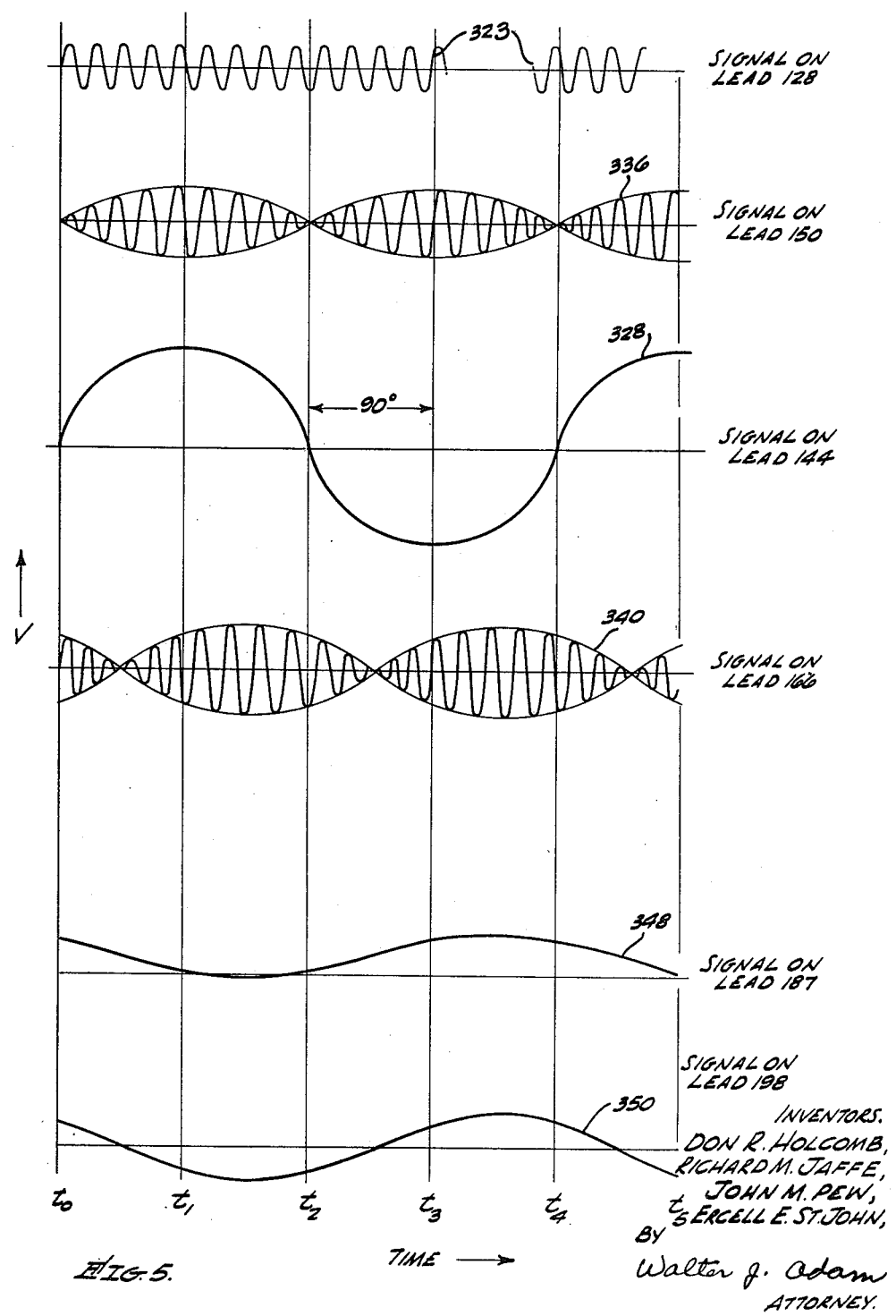

United States Patent Office 3,141,164
Patented July 14, 1964

3,141,164
RADAR RECEIVER UTILIZING NARROW BAND FILTERING AND MULTIPLEXING
Don R. Holcomb, Los Angeles, Richard M. Jaffe, Inglewood, John M. Pew, Los Angeles, and Ercell E. St. John, Hawthorne, Calif., assignors to Hughes Aircraft Company, Culver City, Calif., a corporation of Delaware
Filed June 23, 1958, Ser. No. 744,631
10 Claims. (Cl. 343—16)

This invention relates to monopulse radar receiver systems and particularly to an improved and simplified arrangement for filtering and amplifying the signals obtained from a monopulse antenna.

In the prior art, target angular coordinates have been obtained by combining the output signals of four monopulse geometric horns of a nonrotating antenna into signal combinations or input signals and heterodyning the input signals to IF (intermediate frequency). Separate channels and IF amplifiers are utilized to amplify and to pass each of the input signals through the receiver. The IF input signals are then detected and processed to obtain a measure of the relative amplitude of the signals received by the antenna, and therefore, a measure of the displacement of the antenna axis from the line of sight to the source of signals, that is, the target. One disadvantage of this arrangement is that a plurality of IF amplifiers are required which must be matched in both phase and amplitude to accurately retain the information from the antenna. In order to provide IF amplifiers which meet these requirements, an increased number of amplifier components, all with a high degree of quality are required.

Also in the prior art, attempts to combine or to multiplex the IF input signals from the monopulse antenna into a common amplifier channel has been found to have many disadvantages such as the presence of sideband noise signals which interfere during the multiplexing operation to form extraneous signals. These extraneous signals make detection of the desired signals unreliable. Also, isolation between each of the input signals when combined into the common channel is not maintained and noise or cross talk from one input signal interferes with other input signals. Signals which have sidebands originating from jamming sources or from amplitude scintillation of an echo signal are also passed into the multiplexer together with the input signals. These sideband noise signals after being heterodyned and multiplexed are additive to the signals of other input signals and when passed through the amplifier and through the filters of the system into the detector circuits provide unreliable detection. Furthermore, when frequency multiplexing, the output signal from the multiplexer can only be filtered with a wide pass band since the multiplexed information is spread over a wide region of the spectrum. Thus thermal noise is passed through the system to give a small signal over noise level and to make detection of the desired signals unreliable.

It is therefore an object of this invention to provide a receiver which filters the input signals with narrow-band filters before multiplexing to eliminate jamming signals and noise signals associated with the input signals.

It is a further object of this invention to provide a monopulse receiver which filters the input signals from the antenna by a narrow pass band and then multiplexes these signals in such a manner to separate them sufficiently from each other in a common channel to prevent noise signals from one input signal from interfering with other input signals.

It is a still further object of this invention to provide a simplified and improved monopulse radar receiver which filters the input signals from the antenna, multiplexes the signals so the multiplexed signals are separated by a frequency band so as to maintain isolation between the input signals, and then passes the signals through a common IF amplifier which eliminates the balancing problems associated with a plurality of IF amplifiers.

It is another object of this invention to provide a monopulse doppler radar receiver which filters the input signals then passes the filtered input signals through a multiplexer which separates the signals sufficiently to maintain frequency isolation between the signals and combines the signals into a common signal, passes the common signal through a single amplifier and then separates the common signal into corresponding input signal components.

According to one feature of this invention, a monopulse antenna receives radio-frequency signals from a source of signals. These radio frequency signals are combined into a plurality of input signals, and the combined input signals are separately heterodyned to intermediate frequency and passed through a narrow-band filter to eliminate undesired sidebands. The filtered intermediate frequency signals are then passed into a multiplexer where they are combined into a common signal in a single channel while remaining separated by frequency or time separation, for example, from each other by the multiplexing means. The common signal passes through a common IF amplifier, an arrangement which eliminates the balancing problems characteristic of systems using a separate IF amplifier for each input signal. The common signal is then passed to a signal separator where it is separated into a plurality of signal components corresponding to the plurality of input signals. The multiplexer acts to separate the plurality of input signals from each other in the single channel, thus preventing noise associated with one input signal from interfering with other input signals. This signal separation maintains isolation between the different input signals so the receiver operates as if a plurality of IF amplifiers and channels were being utilized. Thus this invention provides an improved arrangement for passing a plurality of signals from a monopulse antenna to a common amplifier by filtering out sideband signals such as jamming signals, amplitude scintillation signals and thermal noise signals before multiplexing.

The novel features of this invention, as well as the invention itself, both as to its organization and method of operation, will best be understood from the accompanying description, taken in connection with the accompanying drawings, in which like reference characters refer to like parts, and in which:

FIG. 2 is a more detailed block diagram of FIG. 1 illustrating one embodiment of this invention;

FIG. 4 is a schematic diagram showing waveforms of voltage versus time for explaining the operation of the system of FIG. 2; and FIG. 5 is a schematic diagram of waveforms of voltage versus time occurring at similar times to the waveforms of FIG. 4 for further explaining the operation of the system of FIG. 2.

Figure 1:
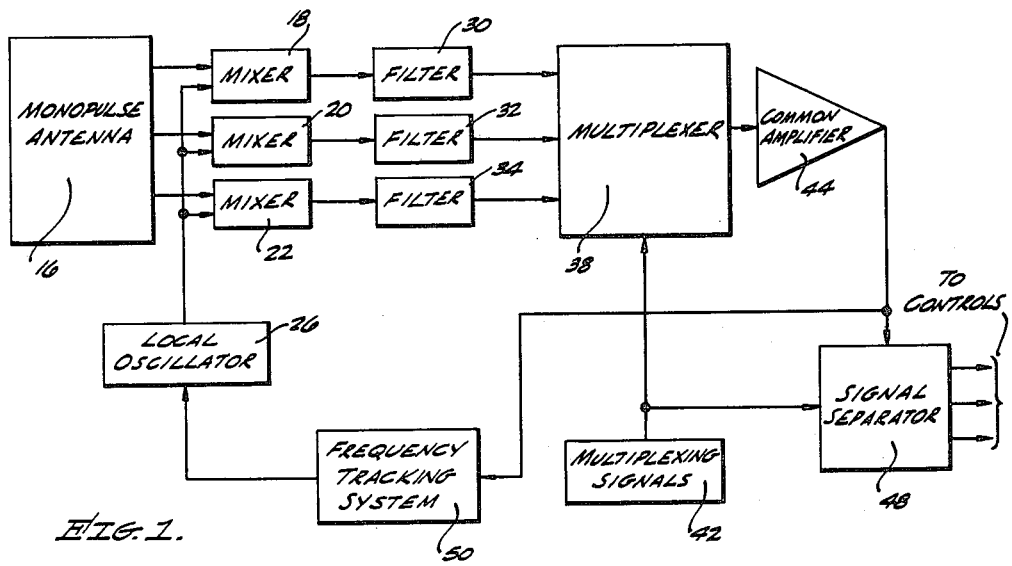
FIG. 1 is a block diagram of the receiver system of this invention.

Referring first to FIG. 1, a block diagram is shown illustrating the radar receiver of this invention. A monopulse antenna 16 is provided to receive RF (radio frequency) signals which may contain doppler information, from a source of signals, such as a target (not shown). The RF signals may be echo signals or signals from any signal source. The RF signals may be combined into combined signals the amplitude of which indicate direction of an object or of a signal source relative to an axis of the antenna 16. A plurality of mixers which may be mixers 18, 20, and 22 are connected to the antenna 16 to receive the combined RF signals. A local oscillator 26 is connected to mixers 18, 20, and 22 to heterodyne the combined RF signals to IF signals. Filters 30, 32, and 34 are connected to the mixers 18, 20, and 22, respectively to receive the IF signals. A multiplexer 38 is connected to the outputs of filters 30, 32, and 34 to receive the filtered IF signals. Multiplexer 38 is connected to a multiplexing signal circuit 42 which as will be explained, acts to combine the plurality of IF input signals into a common signal while separating in frequency, for example, the IF input signals to provide a distinguishing characteristic to each of the input signals. A common IF amplifier 44 is connected to the multiplexer 38 to receive and to amplify the common signal. A signal separator 48 is connected to the output of the common amplifier 44. The signal separator 48 may also be connected to the multiplexing signal circuit 42 to receive the same signals used in the multiplexer 38, as a reference signal for separating the signals. The outputs of the signal separator 48 are connected to control circuitry (not shown). Thus the common signal after passing through the common amplifier 44 is separated into signal components corresponding to the combined input signals and passed to control circuitry which may be aircraft or antenna controls, for example.

The 2 kc. bandpass filters 30, 32 and 34 are conventional crystal filter circuits well known in the art. In a German book entitled "Siebschaltungen mit Schwingkristallen" by Werner Herzog, published July 1949, with Dieterich'she Verlagsbuchhandlung the publisher and W. Klemm the proprietor, Wiesbaden, Germany, FIG. 128 at page 117 (Chapter 5, Section 4) a narrow band crystal filter circuit is shown that may be utilized for the filters 30, 32 and 34. However, in order to provide increased sharpness to the skirt of the pass band, the filter arrangement of FIG. 128 of the Herzog book may be cascaded with two similar arrangements having transformers at both ends. This cascading of filters is well known in the art. Also, the crystals shown in FIG. 128 are well known in the art and crystal design at frequencies of 10 mc. is within conventional principles of the prior art.

Another book which shows a crystal filter that operates in the system of the invention is "Electromechanical Transducers and Wave Filters" by Warren P. Mason, Second Edition, October 1948, reprinted February 1958, D. Van Nostrand Company, Inc., 120 Alexander Street, Princeton, New Jersey. On page 227 of the Mason book, Filter No. 1 of FIG. 8.21 shows a lattice type narrow band crystal filter that will operate in the system of the invention. In order to increase the sharpness and tolerance of the pass band, Filter No. 1 may be transformed to an equivalent bridge economy type circuit having less elements therein. As shown in the book "Communications Networks," vol. II, "The Classical Theory of Long Lines," by Ernst A. Guillemin, 12th Printing, 1956, by John Wiley and Sons, Inc., New York, on pages 159 to 161, the transformation from lattice networks to other type networks having less elements to adjust is well known in the art. Selection of crystals and design techniques to form the 2 kc. pass band at a 10 mc. center frequency is also well known in the prior art.

A frequency tracking system 50 is connected between the output of the common amplifier 44 and the local oscillator 26 in order to control the intermediate frequency derived from the mixers 18, 20, and 22, for passing the desired signals through the pass band of the filters 30, 32, and 34.

In operation, the monopulse antenna 16 may receive RF signals which are combined in a manner depending on the particular type of monopulse antenna utilized, to indicate direction of the source of signals relative to the antenna axis. The combined or input signals are passed to the mixers 18, 20 and 22. It is to be noted that although three combined signals are shown as inputs to the mixers 18, 20, and 22, any number of input lines and mixers representing desired information may be utilized with this invention. The input signals are then heterodyned to intermediate frequency in response to the wave developed by the local oscillator 26 and passed to the filters 30, 32, and 34 at intermediate frequency. The filters 30, 32, and 34 are narrow-band filters and pass only a narrow-band at the frequency of the desired signal.

Figure 3:
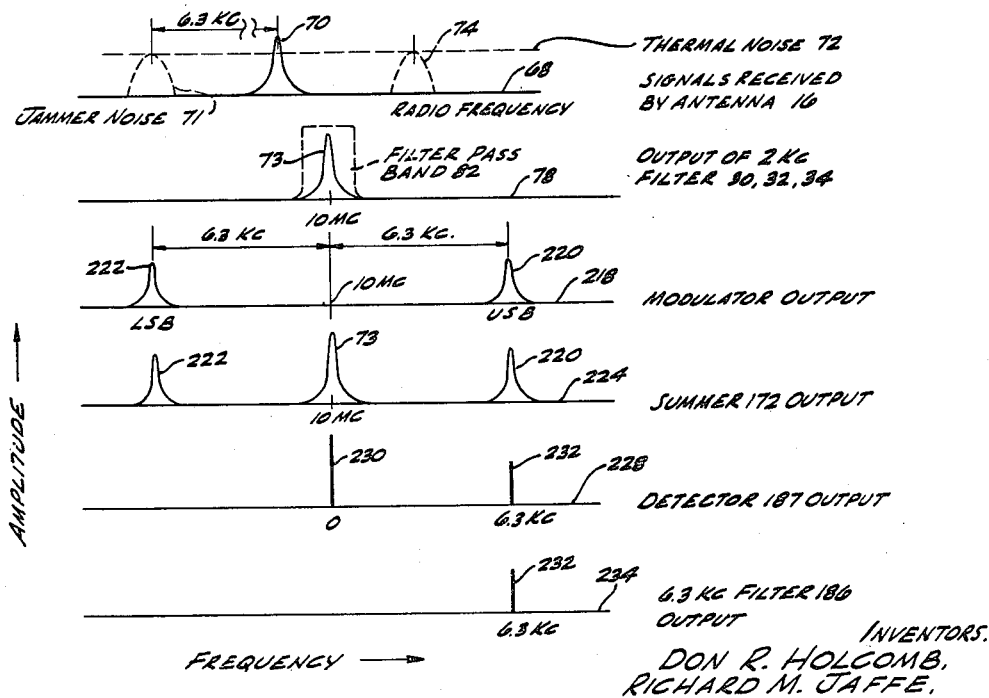
FIG. 3 is a graph of frequency versus amplitude for explaining the operation of the systems of FIGS. 1 and 2.

Referring temporarily to FIG. 3 which is a series of frequency graphs showing frequency versus amplitude, the operation of the filter arrangement will be further explained. In a frequency diagram 68 showing the signal received by the antenna 16, the desired monopulse carrier signal 70 is shown at a radio frequency as received by the antenna 16. A noise component is shown as thermal noise signal 72 by a dotted line which may have amplitudes varying with frequency. A countermeasure jamming component is shown as jammer noise signals 71 and 74 shown in dotted lines and may interfere with detection of the desired signals in the receiver by introducing noise components during the multiplexing and by adding to the other signals intercepted by the antenna 16 after multiplexing. The noise signals 71 and 74 of the graph 68 are shown at 6.3 kc. on either side of the carrier signal 70 to illustrate that the system in accordance with this invention operates reliably with this jamming condition. In a conventional system with a conical scan frequency of 6.3 kc., the angle information is contained in the 6.3 kc. sidebands which after demodulation will be translated to a low frequency error signal. In a conventional conical scan system, severe interference will take place as jamming signals are introduced in the vicinity of the sidebands, since this would result in low frequency noise on the error signals. However, in the system in accordance with this invention utilizing narrow band filtering, interference or jammer noise signals intercepted at the sideband frequencies does not affect the reliability of the system operation. Also a signal similar to the jammer noise signals 71 and 74 may be caused by amplitude scintillation when the antenna 16 is receiving reflected signals, as is well known. The jammer noise signals 71 and 74 received by the antenna 16 are typical jamming signals generated by an enemy countermeasure system. It is also to be noted that the monopulse signal 70 has sideband noise associated with it.

As will be explained, the input signals may be combined into three signals in the antenna 16, so as to indicate antenna directional error, with the combined signals varying only in amplitude from the signals received by the antenna 16, thus having a similar appearance at the outputs of the antenna 16 as shown by the graph 68. The combined signals from the antenna 16 pass to the mixers 18, 20, and 22 where they are heterodyned to intermediate frequency and passed to the filters 30, 32, and 34, respectively. The output of each of the filters 30, 32, and 34 is shown by a graph 78 at intermediate frequency which may be at a frequency of 10 mc. (megacycles per second). The filter pass band 82 is shown 2 kc. (kilocycles per second) wide in the frequency spectrum to pass only the desired carrier or monopulse signal 73 which now has a nominal intermediate frequency of 10 mc. Thus as shown in the graph 78, the jammer noise signals 71 and 74 and the thermal noise signals 72 as shown in graph 68 are prevented from passing through filters 30, 32, and 34. Therefore, desired signals free of interfering sidebands and noise are obtained. The noise associated with a signal 73 obtained from one of the filters 30, 32, or 34, if not allowed to combine with other signals, does not interfere with the operation of the system.

The multiplexer 38 receives the intermediate frequency signals from filters 30, 32, and 34 and, as is well known in the art, combines them into a common signal while providing distinguishing characteristics for separating the signals after amplification. The multiplexer 38 isolates the intermediate frequency signals from each other in the combined signal sufficiently, as for example by frequency separation, so as to maintain isolation between individual intermediate frequency signals. The multiplexing signal generator 42 supplies reference signals to the multiplexer 38 to combine with the intermediate frequency signals and by some type of multiplexing, to provide a means to distinguish the separate or individual IF signals of the combined signal in the signal separator, as will be explained.

The multiplexing operation of the multiplexer 38 may be effected by any of the conventional methods such as frequency multiplexing or time multiplexing. As is well known, frequency multiplexing is obtained by a plurality of oscillators for shifting each input signal from the intermediate frequency of the filters 30, 32, and 34 to a separate frequency before passing the signals to the common amplifier 44. In time multiplexing, each of the signals from the filters 30, 32, and 34 is gated from one input channel to another at a desired pulse repetition frequency so the input signals are separated from each other in time.

The multiplexer 38 is designed to shift the intermediate frequency signals derived from the filters 30, 32, and 34 so as to separate the signals from each other in time or in frequency for example, to prevent one IF signal from interfering with the others in the common output channel of the multiplexer 38. This separation is made possible by the narrow-band filtering which removes the undesired sideband signals including noise from each of the intermediate frequency signals passed into the multiplexer 38. In frequency multiplexing, all but one of the intermediate frequency signals are shifted in frequency more than the bandwidth of filters 30, 32, or 34 so all signals out of the multiplexer 38 are maintained separate from each other. Thus none of the sideband noise signals of one of the monopulse signals 73 received by the monopulse antenna 16 and passed through the filters 30, 32, and 34 is allowed to combine in the common output channel of the multiplexer 38 with the sideband noise signal of other signals 73. The signals passing out of the antenna 16 are effectively separated from each other in the common channel of the amplifier 44 as if a conventional plurality of amplifier channels were provided. In time multiplexing, the repetition period of passing pulses from each channel must be greater than the frequency pass band provided by the filter to provide separation of the signals from each other in the common output channel of the multiplexer 38.

The common signal passes from the multiplexer 38 to the common IF amplifier 44 where the majority of the amplification of the receiver is carried out. The problem of phase and amplitude balancing of a plurality of IF amplifiers in the conventional system utilizing a plurality of channels for amplification is thus eliminated.

The signal separator 48 then receives the amplified signal from the amplifier 44 and responding to the reference signals from multiplexing signal source 42, separates the multiplexed signals into output error signals. The output error signals from the signal separator 48 correspond in relative amplitude and polarity to the combined signals obtained from the monopulse antenna system 16. These output error signals from the signal separator 48 indicate the direction of the antenna axis relative to the line of sight to the source of signals and are impressed on controls which may respond to directional changes.

In order to provide signal discrimination on the basis of small differences of frequency due to doppler shift, the input signal frequency is maintained in the center of the narrow pass band of the filters 30, 32, and 34. A conventional frequency tracking system 50 is utilized to provide velocity tracking for controlling the local oscillator 26, which in turn controls the intermediate frequency passed to the filters 30, 32, and 34. The frequency of the signal derived from the common amplifier 44 controls through the frequency tracking system 50 the frequency of the local oscillator 26.

Referring now to FIG. 2, a detailed block diagram is shown of the monopulse receiver of FIG. 1 utilizing an improved multiplexing system for separating the IF signals, which system is a combination of frequency and phase multiplexing. The monopulse antenna 16 may be a conventional four feed amplitude comparison antenna. Two microwave receiving antennas, shown as horns 100 and 102 are arranged in a vertical plane to respond to the variation indicating pitch of the source of signals from an antenna axis 101. Two other horns 104 and 106 are arranged in a horizontal plane to respond to the variation indicating yaw of the source of signals from the antenna axis 101. The antenna 16 response in each plane varies in amplitude with the amount of displacement of the source of signals from the antenna axis 101. As is well known, the four output signals from the antenna horns 100, 102, 104, and 106 may be combined to give a sum signal of the four signals from horns 100, 102, 104, and 106 and to give a pitch difference signal and a yaw difference signal, which three signals contain the information to indicate pitch and yaw deflection of the signal source from the antenna axis. The amplitude of the pitch and yaw difference signals indicate the deflection of the source of signals in the vertical and horizontal direction, respectively, and the sum signal is utilized as a reference signal. The sum and difference system may comprise a waveguide junction 110 which is a conventional magic T junction. A magic T junction has four branches called waveguides 110a, 110b, 110c, and 110d. The waveguide 110a connects to the junction in the H plane to form the parallel junction, and the line 110b connects to the junction in the E plane to form the series junction. As is well known, power fed simultaneously and in phase into the waveguides 110c and 110d enters the waveguide 110a in additive fashion and enters the waveguide 110b in subtractive fashion. The signal in the waveguide 110b represents the pitch amplitude difference of the two received pitch signals from the horns 100 and 102, and is passed through a lead 124 to the mixer 20. The sum of the signals from the horns 100 and 102 passes into the waveguide 110a.

A similar magic T structure or waveguide junction 114 is connected to horns 104 and 106 by a waveguide 114c and 114d, respectively, to receive the yaw signals. The difference signal which represents the yaw amplitude difference of the signals from the horns 104 and 106 passes into a waveguide 114b of the junction 114 and is impressed on the mixer 22 through a lead 125. The sum of the signals from the horns 104 and 106 is obtained from a waveguide 114a of the waveguide junction 114.

The sum signals in the waveguides 110a and 114a pass simultaneously and in phase into another magic T structure or waveguide junction 118. The signal from the junction 118 enters a waveguide 118a in additive fashion and is derived from a waveguide 118b in subtractive fashion. The sum signal in the waveguide 118a of the junction 118, which signal has an amplitude representative of the sums of the signals received from the pitch horns 100 and 102 and yaw horns 104 and 106, is passed to the mixer 18 through a lead 123. The difference signal in the waveguide 118b of the junction 118 is not utilized and is terminated by a suitable dissipative load 122 to prevent reflections of the signal.

In order to maintain the signals in phase as they pass into the waveguide structures 110 and 114 the distance from the horn 100 and from the horn 102 to the center of the structure 110 must be equal, and the distance from the horn 104 and from the horn 106 to the center of the structure 114 must also be equal. Also, to maintain the signals in phase as they pass into the waveguides 118c and 118d of the structure 118, the distance from the center of the structure 110 to the center of the structure 118 must be equal to the distance from the center of the structure 114 to the center of the structure 118. The sum and difference signals available from the lead 123 and the leads 124 and 125 pass through the mixers 18, 20, and 22 to which they are individually connected, where they are heterodyned to intermediate frequency, by the action of the local oscillator 26. The intermediate frequency signals are then passed through the filters 30, 32, and 34 to separate leads 126, 128, and 130. The filters 30, 32, and 34 pass a frequency band which has a narrow pass band of 2 kc. centered at the intermediate frequency. The multiplexer indicated by dotted rectangle 38 is connected by a lead 126, 128, and 130 to the outputs of the filters 30, 32, and 34, respectively.

A balanced modulator 134 is connected to the filter 32 by the lead 128 and a balanced modulator 136 is connected to the filter 34 by the lead 130. The modulators 134 and 136 are suppressed carrier balanced modulators which are well known in the art. The multiplexer 38 is controlled by the multiplexing signal source 42 to this end. An oscillator 138 is connected to supply signals to a −45 degree phase shifter 140 and a +45 degree phase shifter 142, which will be explained subsequently. The output terminal of phase shifter 140 is connected to the balanced modulator 134 by a lead 144 and the output terminal of the phase shifter 142 is connected by a lead 145 to the balanced modulator 136. The multiplexing signal circuit 42 as shown by the dotted box includes the phase shifters 140 and 142 and the oscillator 138.

A summer indicated by a dotted rectangle 148 is connected to the output terminal of the balanced modulator 134 through a lead 150 and is also connected to the balanced modulator 136 through a lead 152. The summer 148 may comprise a resistor 156 connected to the lead 150 and a resistor 158 connected to the lead 162. The other ends of the resistors 156 and 158 are connected to an output lead 160, which is also connected to ground by way of a resistor 162. Thus, the two intermediate frequency signals obtained from the balanced modulators 134 and 136 are combined in the summer 148. The lead 160 is connected to a potentiometer 166 which in turn is grounded. The variable tap of the potentiometer 166 provides adjustment of the amplitude of the modulated difference signals.

The output signal of potentiometer 166 is passed through a lead 167 to a summer network indicated by a dotted rectangle 172 which receives not only the sum of the modulated signals on the lead 167 but is also connected to the filter 30 through the lead 126 to receive the sum signal from the monopulse antenna 16. The summer 172 may comprise a resistor 174 with one end connected to the potentiometer 166 through the lead 167 and a resistor 173 with one end connected to the lead 126. The other ends of the resistors 173 and 174 are connected to an output lead 176 which is also connected to ground by way of a resistor 178. Thus the three input signals from the antenna 16 are combined in the multiplexer 38 to appear in a single channel on an output lead 176 as a common signal. The multiplexer 38 as shown by the dotted box includes the balanced modulators 134 and 136 and the summers 148 and 172. An IF amplifier 180 is connected to the output lead 176. The amplifier 180 carries out the greater portion of the amplification for the receiver, thus eliminating the amplitude and phase balancing problems inherent in the multiple channels of the prior art.

An automatic gain control (AGC) circuit 182 is provided to normalize the amplified signal from the IF amplifier 180 in response to the sum signal from the antenna 16, as will be explained. The output signal of the AGC circuit 182 is impressed on the input of the amplifier 180. A low pass filter 183 is connected as an input to the automatic gain control circuit 182.

The output terminal of the amplifier 180 is connected to the signal separator indicated by a dotted rectangle 48 by a lead 181. The signal separator 48 comprises an envelope detector 184 connected to the lead 181 to receive the common amplified signal from the amplifier 180. A filter 186 is connected to the output of the envelope detector 184 by a lead 187. The lead 187 connects to the input of the low pass filter 183 by a lead 188 to provide the automatic gain control loop to the amplifier 180. An amplifier 190 is connected to the output of the filter 186.

A phase sensitive detector 194 and a phase sensitive detector 196 are connected in parallel to the amplifier 190 by a lead 198 to receive and to separate the amplified common signal. The phase sensitive detector 194 is connected through a lead 201 to the lead 144 at the output of the phase shifter 140 by way of an amplifier 200. The lead 201 supplies a reference signal to detector 194 for separating the two components which are 90 degrees out of phase from each other from the common signal on the lead 198. The phase sensitive detector 196 is connected through a lead 202 to the lead 145 at the output of the phase shifter 142 by way of an amplifier 204 to provide a reference signal to the detector 196. Phase sensitive detectors 194 and 196 are circuits well known in the art which respond to the portion of the common signal on the lead 198 which is in phase with the reference signals on the lead 202, respectively, as will be discussed. Leads 208 and 210 connect the outputs of the detectors 194 and 196 to the control circuitry (not shown). The signal separator 48 as shown by the dotted box includes the envelope detector 184, the filter 186, the amplifier 190, the phase sensitive detectors 194 and 196, and the amplifiers 200 and 204. The common amplifier 44 as shown by the dotted box includes the IF amplifier 180, the automatic gain control circuit 182, and the low pass filter 183.

The frequency tracking system 50 is connected by a lead 212 to the lead 181 at the output of the amplifier 180. The frequency tracking system 50 is connected to the local oscillator 26 to pass a direct current signal to control the frequency of the wave applied to the mixers 18, 20, and 22. Thus, the intermediate frequency signals from the mixers 18, 20, and 22 are maintained centered at the frequency pass band of the filters 30, 32, and 34. The frequency tracking system 50 is well known in the art, and provides velocity tracking of a moving source of signals by responding to frequency changes in relation to a reference frequency to control the frequency of the wave from the local oscillator 26.

The monopulse receiver may also contain provisions for gating such as a conventional range jitter system connected between the mixers 18, 20, and 22 and the filters 30, 32, and 34. As is well known, this gating circuit is sometimes utilized when a transmitter and a receiver are operated in a conventional pulse-doppler radar system.

Referring now to FIG. 3 as well as to FIG. 2, the operation of the receiver of FIG. 2 will now be explained in greater detail. As discussed, the sum and difference signals at radio frequency are received from the monopulse antenna 16 and are passed to the mixers 18, 20, and 22 where they are heterodyned to intermediate frequency. The intermediate frequency signals are then passed through the filters 30, 32, and 34 which have a narrow frequency pass band centered at the intermediate frequency of 10 mc. As explained by the graph 68 of FIG. 3, the carrier signal 70 obtained from the leads 123, 124, and 125 is at radio frequency intercepted by the antenna 16, accompanied by interfering signals such as thermal noise signal 72 and jammer noise signals 71 and 74. As previously discussed, the jammer noise signals 71 and 74 are shown to illustrate that the system in accordance with this invention will operate reliably when jamming noise or other interference is intercepted by the antenna 16 at the equivalent conical scan frequency. As seen in the graph 78, each of the mixers 18, 20, and 22 heterodyne the radio frequency to an intermediate frequency of 10 mc. which is maintained by the action of the frequency tracking system 50. The interfering signals such as the thermal noise signal 72 and the jammer noise signals 71 and 74 are also present at the intermediate frequency at the outputs of each of the mixers 18, 20, and 22. The graph 78 shows the 2 kc. filter bandpass 82 which allows only the carrier signal 73 to pass through each of the filters 30, 32, and 34. Thus, the interfering or noise signals are prevented from passing into the multiplexer 38. The frequency of the oscillator 138 may for example be selected at 6.3 kc. which is relatively large in comparison with the 2 kc. bandpass of the filters 30, 32 and 34, so that the pseudoconical scan sidebands fall outside of the passbands of the filters. Also, the selected frequency of the oscillator 138 must be low enough so that the sidebands developed by the balanced modulators 134 and 136 are within the passband of the common IF amplifier 180. The oscillator 138 is shown at 6.3 kc. which frequency may, for example, be selected in a system in accordance with this invention considering the width of the filter pass band. Also, when selecting the frequency of the oscillator 138, certain frequencies may be avoided which because of conventional circuit imperfections create harmonic interference within the system. The sideband noise signals of graph 68 in FIG. 3 are shown at 6.3 kc. on both sides of the signal 70 to illustrate the operation of the system when sideband jamming noise, for example, is intercepted at a frequency separation from the signal which is the same as the frequency selected for the oscillator 138.

The sum signal on the lead 126 is represented by the equation $$e_s(t) = A_1 \cos w_1 t$$

where $e_s$ is voltage varying with time $t$, $A_1$ is the maximum amplitude of the signal, and $w_1$ is the angular velocity. The sine wave derived from the local oscillator 26 is represented by $e(t) = a_1 \cos w_2 t$ where $w_2$ is the angular velocity. It is to be noted that $w_1 = w_r - w_2$, where $w_r$ is the angular velocity of the radio frequency wave received by the antenna 16.

The pitch difference signal on the lead 128 is represented by the equation $$e_p(t) = k_p E_p A_1 \cos w_1 t$$

where $e_p(t)$ is the voltage varying with time $t$ and $E_p$ is the error angle in degrees between the line of sight to the source of signals and the zero error center axis 101 of the antenna 16 which is the center axis between the horns 100 and 102. The factor $k_p$ represents the fraction of the pitch difference signal relative to the sum signal $e_s(t)$ which occurs per degree of error angle.

The yaw difference signal on lead 130 is represented by the equation $e_y(t) = k_y E_y A_1 \cos w_1 t$ where $e_y(t)$ is the voltage varying with time $t$ and $E_y$ is the error angle in degrees from the antenna 16 to the line of sight to the source of signals and the zero error center axis 101. The factor $k_y$ represents the fraction of the yaw difference signal relative to the sum signal $e_s(t)$ which occurs per degree of error angle of the source of signals from the center axis 101 of the antenna 16. Thus the difference signals on the leads 128 and 130 are indicative of the pitch and yaw error components from the antenna 16 and the sum signal on the lead 126 is indicative of the sum component of the error signals from the antenna 16. The signal 73 of the graph 78 represents the difference signals and the sum signals on the leads 126, 128, and 130.

The signal from the phase shifter 140 is represented by $e(t) = a_2 \sin w_s t$ where $w_s = 2\pi f_s$ and $w_s$ is the equivalent in radians per second of the multiplexing frequency of 6.3 kc. from the oscillator 138. The signal from the phase shifter 142 is represented by $$e(t) = a_2 \cos w_s t$$

The phase shifter 140 shifts the 6.3 kc. signal ($f_s$) from the oscillator 138, 45 degrees in the lagging or the negative direction and the phase shifter 142 shifts the 6.3 kc. signal ($f_s$), 45 degrees in the leading or the positive direction to yield the output signals on the leads 144 and 145 separated 90 degrees in phase as indicated by the sine and cosine equations on the leads 144 and 145, respectively. Thus the output signals from the balanced modulators 134 and 136 are distinguishable by their phase difference, as they are shifted into quadrature components, 90 degrees out of phase with respect to each other. The waves from the 6.3 kc. oscillator 138 cause the signals on leads 128 and 130 to be balance modulated in the balanced modulators 134 and 136 while suppressing the carrier wave 73.

A graph 218 in FIG. 3 shows the output of the balanced modulators 134 and 136, graph 218 representing the signal on either the lead 150 or the lead 152. The carrier signal 73 of the graph 78 which is at a frequency of 10 mc., is suppressed and an upper sideband signal 220 and a lower sideband signal 222 are formed as a result of the modulations. The sideband signals 220 and 222 are shifted 6.3 kc. on either side of the 10 mc. carrier frequency. It is to be again noted that the outputs of the two balanced modulators 134 and 136 are quadrature components 90 degrees out of phase with respect to each other.

Thus the sideband signals derived from the carrier signal 73 are each shifted from the frequency of the filters 20 and 22 by an amount greater than the filter pass band frequency of 2 kc. This frequency shifting separates the signals so that when combined with the sum signal, as will be discussed, the difference signals from the balanced modulators 134 and 136 are isolated and prevented from interfering with the sum signal.

The equation for the signal on the lead 150 obtained from the balanced modulator 134 is $$e(t) = K_p E_p A_1 \cos w_1 t [\sin w_s t]$$

and the equation for the signal on lead 152 derived from the balanced modulator 136 is $$e(t) = K_y E_y A_1 \cos w_1 t [\cos w_s t]$$

As seen by these equations, the signals on the leads 150 and 152 are of the same form as the sideband signals received from a conventional mechanical conical scan antenna. Thus, the monopulse antenna 16 provides a signal which when balance-modulated with quadrature components has the same form as those signals received from a conical scan system. In effect the scan-modulated components of the signal simulating flow from a mechanical scanning antenna are added electronically by means of the oscillator 138 after the difference signals have passed through the narrow band filters 32 and 34. Therefore, this circuit allows filtering out interfering signals to obtain an IF signal which when added to the sum signal on the lead 126, as will be discussed, may be treated similarly to that obtained from a mechanical scan system.

The sideband signals on the leads 150 and 152 are at the same frequency but are distinguishable from each other since they are in phase quadrature arrangement by the 90 degree phase difference. The signals 220 and 222 of the graph 218 which both appear on the leads 128 and 130 pass through the modulators 134 and 136 and into the summer network 148 where currents passing through the resistor 162 develop a single voltage signal. The signal on the lead 160 passes through the potentiometer 166 where the amplitude of the sidebands may be adjusted. The signal on the lead 167 is also represented by the graph 218 but is of greater amplitude as a result of the summing operation and passes into summer 172 along with the sum signal or carrier signal indicated by the signal 73 on the lead 126. In the summer 172, current passing through the resistor 178 develops a voltage representation of both the carrier signal 73 as illustrated by the graph 78 at the output of the filter 30, and the sideband signals 220 and 222 to give a combined or common signal as shown by a graph 224. It is to be noted that this combined signal contains the information obtained from the antenna 16 to indicate directional error as the two difference signals are contained in the sideband signals 220 and 222, only 90 degrees out of phase. As seen by the graph 224, the sideband signals 220 and 222 and the sum signal 70 are frequency separated by 6.3 kc. Thus, the noise associated with the signals 220 and 222 passing through the 2 kc. filters 32 and 34, respectively, is not additive to the sum signal 73 passed through the filter 30. This separation substantially eliminates noise or spurious response overlap between adjacent signals on the frequency scale. This arrangement permits the use of multiplexing without sacrificing isolation between channels. The filters 30, 32, and 34 are of good quality such that the amplitude response outside of the transmission band is down 60 or more decibels, for example. The receiver of FIG. 2 illustrates frequency separation of the sum signal 73 from the sideband signals 220 and 222. The sideband signals 220 and 222 which both contain information representing each of the difference signals, maintain separation of the difference signals by their 90 degrees phase difference. It is to be noted, however, that this is only one possibility for segregating the signals, as a plurality of signals may be separated after narrow band filtering by utilizing only frequency shifting, for example.

The signal from the multiplexer 38 available on the lead 176 is described by $$e(t) = A_1 \cos w_1 t + KA_1 \cos w_1 [\cos (w_s t + r)]$$

This equation includes the sum signal $A_1 \cos w_1 t$ and includes the combined sideband signals $$KA_1 \cos w_1 t [\cos (w_s t + r)]$$

In these equations $$r = \tan^{-1} \frac{K_p E_p}{K_y E_y}$$

and represents the polar angle of the source of signals to the reference axis 101 of the antenna 16. Also $$K = \sqrt{(k_p E_p)^2 + (k_y E_y)^2}$$

and represents the resultant amplitude vector of the error deviation of the source of signals to the axis 101 of the antenna 16.

It can be readily recognized that the equation of the total signal on the lead 176 is equivalent to the IF signal derived from a conventional mechanically scanning system. Thus this arrangement, as discussed, has the advantage that from lead 176, the signal may be processed and coherently detected to obtain an output from the multiplexing signal source 42 in the same manner that a mechanical scan signal is processed and coherently detected to derive an output from a mechanical scan system. Accordingly, the multiplexing signal source 42 provides an electronic scan signal. Thus, one advantage of this multiplexing arrangement is that a monopulse antenna system may be utilized with an existing amplifying and detecting arrangement suitable for a conical scan system.

The single channel signal of the lead 176 then passes through the IF amplifier 180 where utilization of a single amplifier eliminates the dynamic balancing problems of the prior art multiple channel monopulse systems, as discussed. The amplified signal then passes through the envelope detector 184 which passes only the carrier signal and one sideband signal to the lead 187. As seen by a graph 228, the carrier signal appears on the lead 187 as a direct signal illustrated by a signal 230. The sideband signal is shown by a signal 232 at a frequency of 6.3 kc. The direct current signal 230 passes through a low pass filter 183 where the 6.3 kc. frequency component of the signal 232 is filtered out, and is then passed to the AGC circuit 182. The AGC circuit 182 functions in response to the direct current signal 230 so that the direct current value of $A_1 \cos w_1 t$ acts to normalize the output of the amplifier 180 in order to vary the amplification so that the sum signal, which is the carrier signal on the lead 176, is maintained at a constant value.

The sideband signal 232 is then passed through the filter 186 which acts to eliminate any undesired signals which may appear in the frequency region of the direct current signal 230. The signal 232 thus appears on the output of filter 186 as shown by a graph 234. The sideband signal 232 is then passed through the amplifier 190 to the lead 198 and to the phase sensitive detectors 194 and 196. The amplifier 190 and the amplifiers 200 and 204 are utilized to appropriately adjust the amplitude of the sideband signal 232 and the reference signals from leads 144 and 145. The phase sensitive detectors 194 and 196 each act to respond only to the portion of the signal 232 which is in phase with the reference signal on the lead 201 which is connected to the −45 degree phase shifter 140 and the lead 202 which is connected to the +45 degree phase shifter 142. The equation of the signal on the lead 198 is represented by $[K \cos (w_s t + r)]$. The phases of the signals $e(t)$ on the leads 144 and 145 act to detect the two quadrature components of the resultant signal on the line 198 which are in phase with the signals on the lines 145 and 146. The angle $r$ which is the polar angle of the resultant signal as well as the polar angle of the source of signals passing to the antenna 16, is one of the factors determining the voltage level of the detected pitch and yaw components. The output signal on the lead 208 from the phase sensitive detector 194 is a direct current signal $k_p E_p$ indicating pitch error which is equal to $k \cos r$ of the signal on the lead 198. The signal on the lead 210 from the phase sensitive detector 196 is a direct current signal $k_y E_y$ which is equal to $K \sin r$ of the signal on the lead 198 or the quadrature component 90 degrees out of phase from the component on the line 210. Thus, the receiver forms two error signals which are passed to controls, for example, to direct the path of a craft or to move the antenna 16 so the axis 101 of the antenna 16 is directed toward the target. Thus, the electronic scanning signals from the multiplexing signal source 42 act to separate the quadrature signals on the lead 198 into pitch and yaw componetns.

The frequency tracking system responds to the equivalent frequency of the angular velocity $w_1$ on the lead 181 to maintain the intermediate frequency at the center of the passbands of the filters 30, 32, and 34.

For further explaining the operation of the system in accordance with this invention, the waveforms of FIGS. 4 and 5 show the signals appearing on various leads of FIG. 2. A waveform 310 shows the pulses of radio frequency energy that may be applied to the lead 123 as the sum signal after being intercepted and processed by the antenna 16. Pulses of energy of a waveform 312 are also applied to the lead 125 and similar pulses of energy (not shown) are applied to the lead 124. The pulses of energy applied to the leads 124 and 125 are similar to those of the waveform 310 except with smaller amplitudes. The signals of the waveforms 310 and 312, after being applied through the mixers 18 and 22, are similar in appearance to the waveforms 310 and 312 except at an intermediate frequency. After the intermediate frequency sum signal developed by the mixer 18 is applied through the filter 30, a continuous signal of a waveform 314 is applied to the lead 126. The filter 34 also develops a continuous signal of a waveform 318 on the lead 130.

The oscillator 138 applies a signal (not shown) through the phase shifter 142 to the lead 145 to appear as the reference signal of the waveform 322. The balanced modulator 136 responds to the reference signal of the waveform 322 and the signal of the waveform 318 to develop the modulated signal of a waveform 324 having an amplitude variation similar to that received from a conventional conical scan system. It is to be noted that when the reference signal of the waveform 322 changes polarity, the modulated carrier wave of the waveform 324 changes phase by 180 degrees. It is also to be noted that the time-relations shown in FIGS. 4 and 5 correspond to each other. The time of interception and formation of the pulses of the waveforms 310 and 312 is arbitrary relative to the reference signal because of the continuous wave signals developed by the filters 30, 32 and 34. The reference signal of the waveform 322 may pass through a peak at a time $t_0$, pass through the reference axis at time $t_1$, pass through a peak at a time $t_2$, pass through the reference axis at a time $t_3$, and pass through a peak and the reference axis at respective times $t_4$ and $t_5$. The modulated signal of the waveform 324 has an envelope that varies in phase with the reference signal of the waveform 322.

A reference signal of a waveform 328 (FIG. 5) is applied to the lead 144 and to the balanced modulator 134, lagging the reference signal of the waveform 322 by 90 degrees. The reference signal of the waveform 328 passes through the reference axis at times $t_0$, $t_2$ and $t_4$. A continuous signal of a waveform 323 is applied from the filter 32 to the lead 128 and in turn to the balanced modulator 134. A signal of a waveform 336 is developed by the balanced modulator 134 and applied to the lead 150. The envelope of the signal of the waveform 336 varies in phase with the reference signal of the waveform 328. The modulated signal of the waveform 336 is similar in appearance to a conventional conical scan signal as discussed relative to the signal of the waveform 324 except lagging 90 degrees in phase from the signal of the waveform 324. The summer 148 responds to the signals of the waveforms 324 and 336 to form a combined signal of a waveform 340. The waveform 340 which is the vector sum of the signals on the leads 150 and 152 has an amplitude and phase as determined by the relative magnitudes of the carrier signals of the waveforms 336 and 324. The phase arrangement of the waveform 340 is shown for a condition when the amplitudes of the signals of the waveforms 336 and 324 are equal, so that the reference axis is crossed intermediate between times $t_0$ and $t_1$, times $t_2$ and $t_3$, and times $t_4$ and $t_5$. For the condition when the amplitudes of the signals of the waveforms 336 and 324 are equal, antenna 16 intercepts energy from a target in a position 45 degrees from the reference axis 101 of the antenna 16 and an equal angle from both the pitch and yaw planes.

The summer 172 responds to the signal of the waveform 314 and the signal developed by the summer 148 to provide a combined signal of a waveform 344 (FIG. 4) on the lead 176.

The signal of the waveform 344 is then applied through the amplifier 180 to the envelope detector 184 which applies the signal of a waveform 348 to the lead 187, which signal is also shown as the signal 232 in FIG. 3. The filter 186 responds to the signal of the waveform 348 to remove the D.C. components and form a signal of a waveform 350 varying around a reference voltage, which signal is also shown as the spectral signal 232 of the graph 234 in FIG. 3. The signal of the waveform 350 is shown on the lead 198 after passing through the amplifier 190. The informational signal of the waveform 350 is then applied to the phase sensitive detectors 194 and 196 which respectively respond to the reference signal of the waveforms 328 and 322 to develop D.C. control signals (not shown) as is well known in the art.

The multiplexing system of FIG. 2 allows the use of filtering through a narrow frequency band and separating of the signals to avoid noise interference from one channel to another while using a single IF amplifier 180. It is to be noted that this invention is applicable to systems responsive to combinations of signals other than the sum and difference signals received from the antenna 16. A plurality of signals may be received as discussed in relation to FIG. 1. With the frequency and phase multiplexing system illustrated, each set of three input signals from the antenna 16 would require a multiplexing signal source 42, each including an oscillator 138 oscillating at a separate frequency.

Thus there has been described a monopulse receiver which, after reception and heterodyning of the RF input signals, utilizes narrow band filtering of the intermediate frequency signal and then carries out a multiplexing operation. The multiplexed signals are separated, as in frequency for example, by an amount such that noise from one IF signal does not interfere with the other IF signals. Thus, each IF signal is maintained separated from the others as if separate amplifier channels were being utilized. Therefore, the overlap of noise or spurious signals between adjacent IF signals is kept to a minimum. The multiplexed signals are then passed through a common channel including a common IF amplifier, which eliminates phase and amplitude balancing problems of conventional monopulse systems having a plurality of channels. The amplified signals are then passed to a detecting network and separated into their original components which, because of the filtering, have a high degree of accuracy and reliability as to their relative amplitude.

What is claimed is:

1. A monopulse receiver responsive to monopulse signals intercepted from a target which signals include a carrier wave and sideband signals, said receiver comprising: a monopulse antenna for intercepting said monopulse signals and for developing a plurality of monopulse input signals having a relative amplitude indicating direction of said target, said input signals including a carrier wave and including sideband components developed from said sideband signals; a plurality of narrow-band filters coupled to said antenna means for passing only the carrier wave of: said monopulse input signals; multiplexer means coupled to said plurality of filters, said multiplexer means developing a combined signal representative of the amplitude of said plurality of monopulse input signals; a common amplifier coupled to said multiplexer means for amplifying said combined signal; and means coupled to said common amplifier for separating the amplified combined signal into output components having relative amplitudes representative of said relative amplitude of said plurality of monopulse input signals, whereby the direction of said target is accurately represented by said output components by removing sideband components from said monopulse input signals before developing said combined signal and passing it through said common amplifier.

2. A monopulse receiver for intercepting signals from a source, said signals including carrier waves and associated sideband signals, said receiver comprising: monopulse antenna means for developing a plurality of input carrier waves from said signals from the source having sideband components associated therewith developed from said sideband signals, the relative amplitude of said input carrier waves indicating direction of said source of signals; narrow band filter means coupled to said antenna means to filter out said sideband components from said input carrier waves and to pass substantially only said input carrier waves; multiplexing means coupled to said filter means for combining said plurality of input carrier waves into a common signal; an amplifier coupled to said multiplexing means for amplifying said common signal to derive an amplified common signal; and separator means coupled to said amplifier for separating said amplified common signal into a plurality of output components corresponding in relative amplitude to said plurality of input carrier waves from said antenna means, whereby filtering out of said sideband components allows said plurality of input carrier waves to be multiplexed into a common signal without said sideband components changing the relative amplitudes of said input carrier waves.

3. An amplifying system for receiving a plurality of carrier frequency signals including sideband signals associated therewith, said plurality of carrier frequency signals having informational amplitudes, said system comprising: a source of said plurality of carrier frequency signals and associated sideband signals; a plurality of narrow band filters coupled to said source for passing said plurality of carrier frequency signals while filtering out said associated sideband signals; multiplexing means coupled to said filters for segregating said plurality of filtered carrier frequency signals so each of said plurality of filtered carrier frequency signals is separated from the others in frequency, and for combining said frequency separated signals into a common signal; an amplifier coupled to said multiplexing means for amplifying said common signal; and a signal separator coupled to said amplifier for developing a plurality of output signals corresponding to said plurality of carrier frequency signals in relative amplitude, whereby removing said sideband signals before multiplexing and separating said filtered carrier frequency signals before forming said common signal prevents said sideband signals from affecting said relative amplitude of said output signals.

4. In a receiver for a monopulse radar system for intercepting radio frequency signals from a source, said signals including carrier waves and sideband signals, said receiver comprising: a monopulse antenna having a pair of yaw horns and a pair of pitch horns for receiving said radio frequency signals, said antenna having a center axis, said pitch horns intercepting said radio frequency signals to develop first signals including carrier waves and sideband signals, the amplitude difference of said carrier waves being indicative of pitch deflection of said target, said yaw horns intercepting said echo signals to develop second signals including carrier waves and sideband signals, the amplitude difference of said carrier waves indicative of yaw deflection of said target; a first signal combining structure coupled to said pitch horns for receiving said first signals to form a pitch difference signal having an amplitude indicative of pitch deflection of said target and for forming a first sum signal, said pitch difference signal including pitch carrier waves and sideband signals; a second signal combining structure coupled to said yaw horns for receiving said second signals to form a yaw difference signal having an amplitude indicative of yaw deflection of said target and for forming a second sum signal, said yaw difference signal including yaw carrier waves and sideband signals; a third signal combining structure coupled to said first and second structures to receive said first and second sum signals for forming a reference signal having an amplitude indicative of the sum of said first and second signals, said reference signal including reference carrier waves and sideband signals; narrow band filter means coupled to said first, second and third structures for receiving said pitch and yaw difference signals and said reference signal and for filtering out said sideband signals thereof and passing substantially only said carrier waves; multiplexing means coupled to said filter means for receiving said pitch, yaw and reference carrier waves of said pitch and yaw difference signals and said reference signal, and for combining said pitch, yaw and reference carrier waves into a common signal; an amplifier coupled to said multiplexing means for amplifying said common signal; and detecting means coupled to said amplifier for receiving the amplified common signal and developing output signals having relative amplitudes indictive of pitch and yaw deflection of said signal source from the antenna center axis, whereby filtering of said reference signals and difference signals to eliminate said sideband signals before multiplexing prevents interference of said sideband signals with said carrier waves of said pitch and yaw difference signals and said reference signal when combined into said common signal.

5. A monopulse receiver for receiving signals from a target, said signals including carrier waves having associated noise components and undesired sideband signals, said receiver comprising: a monopulse antenna having a plurality of horns for receiving said signals from the target to form a first plurality of signals, said first plurality of signals each including first carrier waves and associated noise components and including undesired sideband signals, the amplitude characteristics of said carrier wave being representative of the direction of said target; a combining network coupled to said antenna for forming a second plurality of signals, each of said second plurality of signals including carrier waves having associated noise components and including undesired sideband signals; the relative amplitude of said carrier waves defining direction of said target; a plurality of filters coupled to said network for receiving said second plurality of signals for filtering out said undesired sideband signals and for passing said carrier waves having associated noise components; multiplexing means coupled to said plurality of filters and having a common output channel and for separating said carrier waves and associated noise components of said second plurality of signals in frequency and combining signals into a common signal in said output channel; oscillator means coupled to said multiplexer for controlling said multiplexing means; a common amplifier coupled to said output channel for amplifying said common signal; and signal separating means coupled to said common amplifier and coupled to said oscillator means for coherently detecting said common signal to develop a plurality of output signals corresponding in relative amplitude to said second plurality of input signals to define the direction of said target, whereby filtering of said second plurality of signals and separating them in frequency allows said multiplexing means to operate without interference from said sideband signals and allows said second plurality of signals to be segregated in said combined signals so said noise components associated with each of said second plurality of signals do not interfere with other ones of said second plurality of signals.

6. A monopulse receiver for processing through a common channel a plurality of input signals of radio frequency received from a monopulse antenna system, said input signals including a carrier wave and associated sideband frequency signals, the amplitude of said carrier waves being indicative of direction of a target from the axis of said antenna, said receiver comprising: mixing means coupled to said antenna system for converting said plurality of input signals to a plurality of intermediate frequency signals, each including a carrier wave and associated sideband frequency signals; a plurality of filters coupled to said mixing means, said filters having characteristics for passing only a frequency band inclusive of said carrier wave of said intermediate frequency signals; multiplexing means coupled to said filters having said common channel for an output; oscillator means coupled to said multiplexing means for combining said carrier waves of said plurality of intermediate signals into a common signal, each intermediate frequency signal being frequency separated from the others; a common amplifier coupled to said common channel of said multiplexing means for amplifying said common signal; and signal detecting means coupled to said common amplifier and to said oscillator for coherently detecting said amplified common signal to develop a plurality of output signals corresponding in relative amplitude to the relative amplitude of said carrier waves of said plurality of input signals, whereby filtering out of said sideband frequencies and frequency separating said carrier waves of said intermediate frequency signals allows forming of said common signal for amplification while maintaining each intermediate frequency signal segregated from the others to prevent interference between said intermediate frequency signals.

7. A monopulse receiver for amplifying in a single channel a plurality of desired radio frequency signals, each signal including carrier waves and undesired sideband frequency signals, said radio frequency signals being developed in a combining circuit in response to signals received from a monopulse antenna system, the relative amplitude of said carrier waves of said radio frequency signals indicating direction of a target from the axis of said antenna, said receiver comprising: mixing means coupled to said antenna system for receiving said plurality of radio frequency signals and heterodyning them to a plurality of intermediate frequency signals, each signal including carrier waves and undesired sideband signals; a plurality of filters coupled to said mixing means for filtering out said undesired sideband signals from each of said plurality of intermediate frequency signals while passing the carrier waves of said intermediate frequency signals; multiplexing means coupled to said filters; control means coupled to said multiplexing means for controlling said multiplexing means to frequency separate each of said plurality of carrier waves of said intermediate frequency signals from each other and for combining said carrier waves into a common signal; a common amplifier coupled to said multiplexing means for amplifying said common signal; and detecting means coupled to said amplifier and to said control means for developing a plurality of output signals from said common signal having the same relative amplitude of said carrier waves of said radio frequency signals, whereby filtering out of said sideband signals and frequency separating said carrier waves of said intermediate frequency signals to prevent interference between said plurality of carrier waves when combined into said common signal allows utilization of a common amplifier while accurately maintaining said relative amplitude of said carrier waves of said plurality of intermediate frequency signals.

8. A monopulse receiver for receiving radio frequency signals from a target, said radio frequency signals having a carrier wave and sideband signal, and for amplifying said radio frequency signals in a common amplifier while accurately maintaining their amplitude characteristics, said receiver comprising: a monopulse antenna for receiving said radio frequency signals from said target; combining means coupled to said antenna for combining said radio frequency signals into a plurality of directional signals, each directional signal including carrier waves and sideband signals, said carrier waves having amplitudes indicating direction of said target; heterodyning means coupled to said combining means for converting each of said directional signals to intermediate frequency signals, each intermediate frequency signal including a carrier wave and sideband signals; separate filter means coupled to said heterodyning means for filtering each of said intermediate frequency signals through a narrow frequency band to pass only said carrier waves of said intermediate frequency signals; multiplexing means coupled to said filter means for receiving and combining the plurality of carrier waves of said intermediate frequency signals into a combined signal, the frequency band associated with each of said carrier waves of said plurality of intermediate frequency signals being separated from the other frequency bands, said common amplifier being coupled to said multiplexing means for amplifying said combined signal; oscillator means coupled to said multiplexing means for controlling said multiplexing means; and detecting means coupled to the output of said common amplifier and coupled to said oscillator means for separating said combined signal into a plurality of components, said components corresponding to the carrier waves of said plurality of directional signals in relative amplitude, whereby filtering out of said sideband signals and frequency separating said carrier waves of said intermediate frequency signals maintains the amplitude characteristics of carrier waves of said intermediate frequency signals when multiplexed into said combined signal.

9. A monopulse receiver for responding to echo signals from a source, said signals including a carrier wave and sideband components, said receiver comprising: a monopulse antenna having a plurality of antenna horns for receiving said signals from a source; a network coupled to said plurality of horns for developing a first plurality of signals from said signals from said source, each of said first plurality of signals including carrier waves having amplitude characteristics defining direction of said target and including sideband components; mixing means coupled to said network for heterodyning said first plurality of signals to a plurality of intermediate frequency signals, each of said intermediate frequency signals including a carrier wave and sideband components; a plurality of filters coupled to said mixing means for filtering out said sideband components from said intermediate frequency signals; a multiplexer coupled to said filters for combining said carrier waves of said plurality of intermediate frequency signals into a common signal; control means coupled to said multiplexer for passing a wave to control said multiplexer for separating in frequency said carrier waves of said plurality of intermediate frequency signals to prevent interference between said intermediate frequency signals when combined in said common signal; a common amplifier coupled to said multiplexer for receiving said common signal; and means coupled to said amplifier and to said control means for detecting said common signal to obtain a plurality of output components having relative values corresponding to the relative amplitudes of said carrier waves of said first plurality of signals.

10. A monopulse receiver for receiving a plurality of monopulse signals and associated sideband noise components from a monopulse antenna system, the relative amplitude of said monopulse signals indicating directional information, said receiver comprising: a plurality of filters coupled to said antenna system having a pass band for filtering out said sideband noise components and for passing a frequency band of said monopulse signals; multiplexing means coupled to said plurality of filters for forming a combined signal from said plurality of monopulse signals; oscillator means coupled to said multiplexing means for separating said frequency bands of said monopulse signals from each other in said combined signal; and coherent detecting means coupled to said multiplexing means and to said oscillator means for detecting a plurality of output signals corresponding in relative characteristics to the relative amplitude of said plurality of monopulse signals, whereby filtering out of said sideband noise components and separating the frequency band of said monopulse signals prevents interference between said plurality of monopulse signals in said combined signal.

References Cited in the file of this patent

UNITED STATES PATENTS

| | | |
|---|---|---|
| 2,873,443 | Raboy | Feb. 10, 1959 |
| 2,929,056 | Page | Mar. 15, 1960 |
| 2,980,906 | McClellan | Apr. 18, 1961 |